United States Patent [19]

Black

[11] Patent Number: 5,034,148

[45] Date of Patent: Jul. 23, 1991

[54] CLEANSING COMPOSITIONS

[75] Inventor: Brian D. Black, North Humberside, England

[73] Assignee: BP Chemicals Limited, London, England

[21] Appl. No.: 442,566

[22] Filed: Nov. 29, 1989

[30] Foreign Application Priority Data

Nov. 29, 1988 [GB] United Kingdom ................. 8827826

[51] Int. Cl.[5] .......................... C02F 5/10; C02F 11/10; C11D 7/08; C11D 7/50

[52] U.S. Cl. .................................... 252/142; 252/146; 252/180; 252/173; 252/174.21; 252/174.22; 252/82; 252/DIG. 14; 134/41

[58] Field of Search ....... 252/142, 136, 146, DIG. 14, 252/117, 82, 89.1, 174.21, 173, 122, 180; 134/41

[56] References Cited

U.S. PATENT DOCUMENTS

| | | | |
|---|---|---|---|
| 4,092,273 | 5/1978 | Inamorato | 252/DIG. 14 |
| 4,305,837 | 12/1981 | Kaminsky et al. | 252/174.12 |
| 4,318,818 | 3/1982 | Letton | 252/122 |
| 4,323,461 | 4/1982 | Quinlan | 252/180 |
| 4,368,147 | 1/1983 | Inamorato | 252/174.21 |
| 4,486,329 | 12/1984 | Ellis et al. | 252/117 |
| 4,507,219 | 4/1985 | Hughes | 252/DIG. 14 |

FOREIGN PATENT DOCUMENTS

| | | |
|---|---|---|
| 900897 | 2/1985 | Belgium . |
| 375426 | 5/1923 | Fed. Rep. of Germany . |
| 428051 | 1/1967 | Switzerland . |
| 1505388 | 4/1978 | United Kingdom . |

*Primary Examiner*—Paul Lieberman
*Assistant Examiner*—Kevin D. McCarthy
*Attorney, Agent, or Firm*—Brooks Haidt Haffner & Delahunty

[57] ABSTRACT

This invention relates to a cleansing composition comprising a detergent and an acid salt and/or a complex of formic acid which has more than one chemical equivalent of formate ion per cation other than hydrogen. The compositions are suitable for cleaning stains and iron oxide deposits caused by the braking mechanism of railway carriages.

8 Claims, No Drawings

CLEANSING COMPOSITIONS

The present invention relates to cleansing compositions comprising a detergent and an acid formate in aqueous solution.

Various cleansing compositions comprising detergents and acids have hitherto been formulated. In particular a composition comprising a detergent and oxalic acid is used for cleansing stains and iron oxide deposits caused by the braking mechanism of railway carriages. Such compositions though effective contain a high concentration, e.g. up to 92% w/w of oxalic acid which is increasingly becoming unacceptable due to its toxicological properties. It is also inconvenient to use since, being a solid, it must be dissolved in a solvent e.g. water prior to use. It has therefore become apparent that the users of these known cleansing compositions are seeking alternative formulations which can perform the necessary cleansing function but have relatively lower associated toxicological risks, and preferably are liquids for ease of use.

Accordingly, the present invention is a cleansing composition comprising in aqueous solution a detergent and an acid salt and/or complex of formic acid.

Acid salts and/or complexes of formic acid comprise more than one chemical equivalent of a formate ion per cation which is other than hydrogen. Such acid salts and/or complexes are claimed and described in our prior published GB-A-1505388. Of these tetraformate salts and/or complexes, which comprise one chemical equivalent of a formate ion and three chemical equivalents of formic acid and one chemical equivalent of a cation derived from $NH_3$ or a Group I or Group II metal according to the Periodic Table, are preferred.

The tetraformates are suitably those of $NH_4^+$, $Na^+$, $K^+$, $Ca^{++}$ or $Mg^{++}$, preferably those of $NH_4^+$, $Na^+$ or $K^+$, most preferably ammonium tetraformate.

The cleansing composition of the present invention suitably contains the acid salt and/or complex and the detergent in a weight ratio of 30–70:0.5–20 respectively, preferably from 35–70:0.5–10 respectively.

The detergent component of the composition may be any suitable surfactant compatible with or capable of forming a homogeneous solution with the acid salt and/or complex when in aqueous solution. A typical example of such a detergent is a nonyl phenol ethoxylate, especially a nonyl phenol ethoxylate with about 8 or 9 moles of ethylene oxide per mole of nonyl phenol. Ethylan TU or BCP (Regd. Trade Mark) marketed by Lankro Chemicals Ltd is an example.

A typical cleansing composition is suitably diluted with water such that the active ingredients consisting of the acid salt and/or complex and the detergent is suitably present in aqueous solution in an amount from 1–15%, preferably from 2.5–10% w/w.

The compositions of the present invention may optionally contain other components such as citric acid, phosphoric acid, oxyalkylene glycols and the like to enhance performance thereof. A preferred oxyalkylene glycol is ethoxypropoxy propanol.

Where such optional ingredients are present, these are suitably used in the composition in a manner that the amount used replaces an equivalent amount of the tetraformate salt from the composition provided that the amount of the tetraformate salt is never less than 10% w/w of the total active ingredients in the composition. Thus, a typical formulation may contain the tetraformate salt:optional ingredient:detergent in a weight ratio of 45:45:10 respectively.

Thus a typical formulation may contain an aqueous solution of ammonium tetraformate aqueous solution (70% strength) 43.75 parts, phosphoric acid aqueous solution (85% strength) 49.25 parts, ethoxypropoxy propanol (EPD) 5.0 parts, nonyl phenol ethoxylate (9 moles EO) 2.0 parts.

No additional water is necessary in such a formulation.

The present invention is further illustrated with reference to the following Examples.

GENERAL METHOD

The method used initially forms an adherent iron oxide stain on a substrate surface simulating the stain on a railway carriage and then the efficiency of the cleansing compositions in removing the stains is tested as follows:

MATERIALS

- Ferric chloride hexahydrate ($FeCl_36H_2O$) general purpose grade
- Distilled water
- Ammonium tetraformate (70% $^w/_w$ aqueous solution, (ATF))
- Detergent—Ethylan TU (nonyl phenol ethoxylate)—Ex Lankro Chemicals Ltd.
- Citric acid
- Ethoxypropoxy propanol (EDP)

DETAILED PROCEDURE 54 g of ferric chloride hexahydrate was dissolved in 100 ml of distilled water (Solution A). The solution was allowed to stand to allow any froth produced to settle.

12 ml of Solution A was added to 750 ml of distilled water which was heated to 90° C. to form the iron oxide solution (Solution B).

A cleansing composition of the present invention (described in the tables below) was prepared by dissolving 25 g of the composition under test in 1 litre of distilled water.

Six microscope glass slides were prepared for the test and each slide was totally immersed in Solution B at 20° C.±5° C. for 5 seconds and then removed in order to allow excess solution on the slide to drain off.

Each slide was then held on a support and allowed to dry at room temperature (20° C.±5° C.) overnight under a dust cover.

The dried slides were thus coated with an adherent iron oxide stain along with some loosely bound material.

The stained slide is then immersed in distilled water within an ultrasonic bath and ultrasonically agitated for 20 seconds so as to remove the loosely bound material from the surfaces of the slide.

The stained slide is thereafter removed from the bath and allowed to dry at 20° C.±5° C.

The extent of stain on the slide was then measured using a spectrophotometer (Ts) which had to be calibrated to 100% transmission using a blank slide at a wave length of 400 nm.

After measuring the stain on each slide, the slides were cleaned with the cleansing compositions of the present invention shown in the table below. This was done by immersing the stained slide in the composition in an ultrasonic bath and subjecting the slide to ultrasonic agitation for 7 minutes at a temperature of 20° C.±2° C.

The washed slides were then removed and allowed to air dry (20° C.±5° C.).

The transmission of each of the treated slides after washing and drying was again measured (Tc) using the procedure described above.

The difference in transmission between the stained slide (Ts) and the cleaned slide (Tc) was then calculated for each slide and averaged over the six slides used for each cleansing composition tested.

$$\text{The \% stain removal} = \frac{Tc - Ts}{100 - Ts} \times 100$$

The results for a series of tests are shown below.

| Test | Cleansing Composition | | | wt % in aqueous soln | & stain removal |
|---|---|---|---|---|---|
| 1 | ATF | - | 92 parts | 2.5 | 14.0 |
| | Detergent | - | 2 parts | | |
| | Water | - | 6 parts | | |
| 2 | ATF | - | 85 parts | 2.5 | 11.4 |
| | Detergent | - | 3.75 parts | | |
| | Water | - | 11.25 parts | | |
| 3 | ATF | - | 80 parts | 2.5 | 11.0 |
| | Detergent | - | 5 parts | | |
| | Water | - | 15.0 parts | | |
| 4 | ATF | - | 45 parts | 2.5 | 8.9 |
| | EDP | - | 45 parts | | |
| | Detergent | - | 2.5 parts | | |
| | Water | - | 7.5 parts | | |
| 5 | ATF | - | 45 parts | 2.5 | 14.3 |
| | Citric acid | - | 45 parts | | |
| | Detergent | - | 2.5 parts | | |
| | Water | - | 7.5 parts | | |

ATF - 70% w/w aqueous solution of ammonium tetraformate.

Further tests 6, 7 and 8 were performed using for cleaning the following formulations on actual sections of railway carriage soiled by iron oxide. The efficiency of cleaning shown represent the performance based on a base line of 100% corresponding to complete removal of the soil. All abbreviations used have the same meaning as for tests 1-5 above.

| Term | FORMULATION Components | wt % | Cleaning Efficiency (%) |
|---|---|---|---|
| 6 | ATF | 97.5 | 60 |
| | Detergent | 2.5 | |
| 7 | ATF | 87.5 | |
| | Detergent | 2.5 | 65 |
| | EDP | 10.0 | |
| 8 | ATF | 65.6 | |
| | Detergent | 2.5 | 70 |
| | Citric Acid | 21.9 | |
| | EDP | 10.0 | |

I claim:

1. A cleansing composition comprising in aqueous solution (1) a detergent and (2) from one to 15 percent by weight an acid salt of formic acid, an acid complex of formic acid, or mixtures of the salt and complex, wherein the said acid salt and complex of formic acid comprise more than one chemical equivalent of a formate ion salt per cation other than hydrogen.

2. A composition according to claim 1 wherein the acid salt and/or complex is a tetraformate comprising one chemical equivalent of a formate ion, three chemical equivalents of formic acid and one chemical equivalent of a cation derivable from ammonia, a Group I metal or a Group II metal according to the Periodic Table.

3. A composition according to claim 3 wherein the acid salt and/or complex and the detergent are present in a weight ratio of 30-70:0.5-20 respectively.

4. A composition according to claim 1 wherein the detergent in said composition is a surfactant compatible with or capable of forming a homogeneous solution with the acid salt, and/or complex of formic acid in aqueous solution.

5. A composition according to claim 4 wherein the surfactant is a nonyl phenol ethoxylate.

6. A composition according to claim 5 wherein the surfactant is a nonyl phenol ethoxylate containing about 8 moles of ethylene oxide per mole of nonyl phenol.

7. A composition according to claim 1 wherein said composition contains a component selected from citric acid, phosphoric acid, an oxyalkylene glycol and mixtures thereof.

8. A composition according to claim 7 wherein the oxyalkylene glycol is ethoxypropoxy propanol.

* * * * *